United States Patent
Chiang et al.

(10) Patent No.: US 9,299,966 B2
(45) Date of Patent: Mar. 29, 2016

(54) HIGH ENERGY HIGH POWER ELECTRODES AND BATTERIES

(75) Inventors: Yet-Ming Chiang, Framingham, MA (US); Andrew C. Chu, Cambridge, MA (US); Young-Il Jang, Newtonville, MA (US); Michael Wixom, Ann Arbor, MI (US)

(73) Assignee: A123 Systems LLC, Livonia, MI (US)

( * ) Notice: Subject to any disclaimer, the term of this patent is extended or adjusted under 35 U.S.C. 154(b) by 833 days.

(21) Appl. No.: 12/411,380

(22) Filed: Mar. 25, 2009

(65) Prior Publication Data
US 2009/0246636 A1    Oct. 1, 2009

Related U.S. Application Data

(60) Provisional application No. 61/039,387, filed on Mar. 25, 2008.

(51) Int. Cl.
| | |
|---|---|
| *H01M 2/16* | (2006.01) |
| *H01M 4/131* | (2010.01) |
| *H01M 4/139* | (2010.01) |

(Continued)

(52) U.S. Cl.
CPC ............ *H01M 2/166* (2013.01); *H01M 2/1673* (2013.01); *H01M 4/131* (2013.01); *H01M 4/139* (2013.01); *H01M 4/64* (2013.01); *H01M 10/052* (2013.01); *H01M 10/0585* (2013.01); *Y02E 60/122* (2013.01); *Y02P 70/54* (2015.11); *Y10T 29/49108* (2015.01)

(58) Field of Classification Search
CPC ....... H01M 4/80; H01M 4/808; H01M 10/04; H01M 4/48; H01M 4/58
USPC .......... 429/231.95, 209, 210; 29/623.2, 623.4
See application file for complete search history.

(56) References Cited

U.S. PATENT DOCUMENTS 3,055,963 A * 9/1962 Krebs ........................... 429/222
5,200,281 A    4/1993 Leap et al.

(Continued)

FOREIGN PATENT DOCUMENTS

| JP | 58-192271 | * 11/1983 | ............ H01M 12/08 |
|---|---|---|---|
| JP | 04002065 B2 | 1/1992 | |

(Continued)

OTHER PUBLICATIONS

International Search Report issued for PCT/US2009/038308, dated Nov. 10, 2009 (2 pages).

(Continued)

*Primary Examiner* — Rena L Dye
(74) *Attorney, Agent, or Firm* — Alleman Hall McCoy Russell & Tuttle LLP

(57) ABSTRACT

Subassemblies for use in an electrochemical device are provided, as are processes for preparing the subassemblies and electrochemical cells incorporating the subassemblies. In some embodiments, the subassemblies include (a) a first electrode and (b) a separator or a first current collector or both. The first electrode is bonded to the separator or the first current collector or both. In some embodiments, the subassemblies further include a second electrode and a second current collector. In some embodiments, the electrodes or separators are sintered. Bipolar cells are also provided, including a plurality of stacked electrochemical cells that are joined in series. The positive electrode and the negative electrode of each stack include a sintered electrode.

62 Claims, 7 Drawing Sheets

(51) Int. Cl.
*H01M 4/64* (2006.01)
*H01M 10/052* (2010.01)
*H01M 10/0585* (2010.01)

(56) References Cited

U.S. PATENT DOCUMENTS

| | | | |
|---|---|---|---|
| 5,763,119 A * | 6/1998 | Adachi | 429/199 |
| 6,287,728 B1 | 9/2001 | Kajiura et al. | |
| 6,679,926 B1 | 1/2004 | Kajiura et al. | |
| 2002/0146625 A1* | 10/2002 | Probst | 429/241 |
| 2004/0005265 A1 | 1/2004 | Chiang et al. | |
| 2005/0221708 A1* | 10/2005 | Shigematsu et al. | 442/327 |
| 2006/0073388 A1* | 4/2006 | Harada et al. | 429/245 |
| 2007/0031732 A1 | 2/2007 | Chiang et al. | |
| 2007/0166617 A1 | 7/2007 | Gozdz et al. | |
| 2007/0172739 A1 | 7/2007 | Visco et al. | |
| 2007/0259271 A1 | 11/2007 | Nanno | |
| 2009/0029261 A1 | 1/2009 | Thomas-Alyea et al. | |
| 2009/0155678 A1 | 6/2009 | Less et al. | |

FOREIGN PATENT DOCUMENTS

| | | |
|---|---|---|
| JP | 08222273 | 8/1996 |
| JP | 2000277147 A | 10/2000 |
| JP | 200193535 A | 4/2001 |
| JP | 2002324538 A | 11/2002 |
| JP | 2003-346895 A | 12/2003 |
| JP | 2005032938 A | 2/2005 |
| JP | 2007200686 A | 8/2007 |
| JP | 2007258160 A | 10/2007 |
| JP | 2007287445 A | 11/2007 |
| KR | 10-2007-0069200 | 7/2007 |
| WO | WO-2005013400 A2 | 2/2005 |
| WO | WO-2007135790 A1 | 11/2007 |
| WO | WO-2008153749 A1 | 12/2008 |

OTHER PUBLICATIONS

European Search Report for European App. No. 09724612.8, 10 pgs., date mailed Dec. 10, 2013.

* cited by examiner

Figure 3
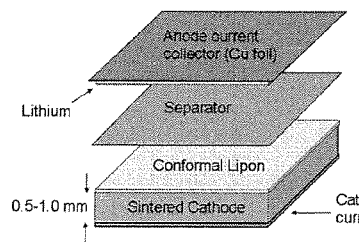
Fig. 3a
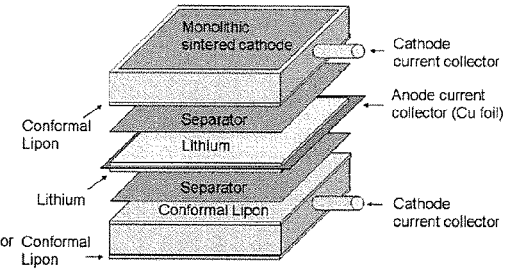
Fig. 3b
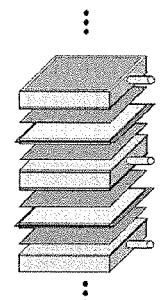
Fig. 3c

Figure 4
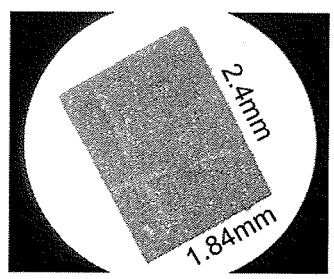
Fig. 4a
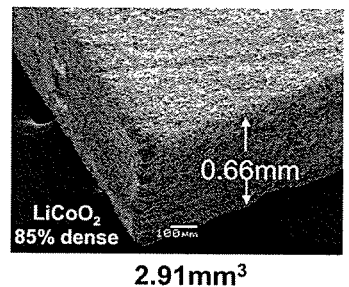
2.91mm³
Fig. 4b
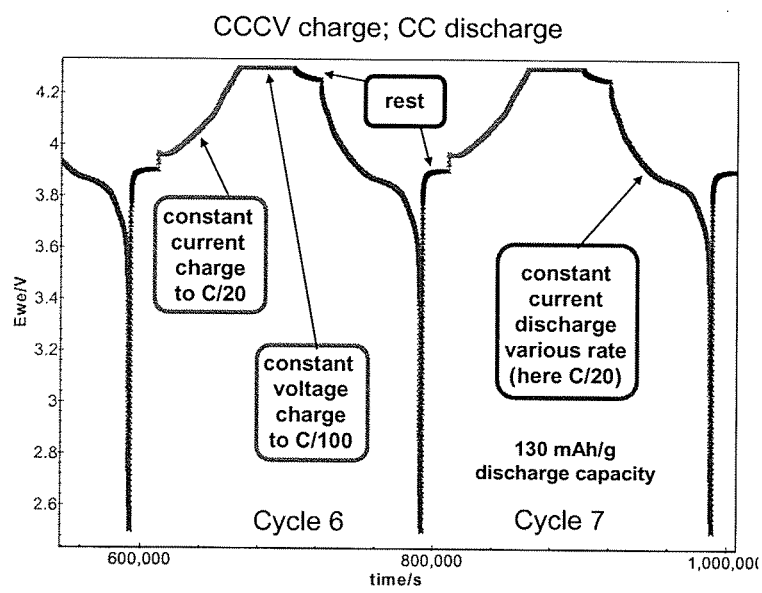
Fig. 4c

100# HIGH ENERGY HIGH POWER ELECTRODES AND BATTERIES

RELATED APPLICATIONS

This application claims priority under 35 U.S.C. §119(e) to copending U.S. Patent Application No. 61/039,387, entitled "High Energy High Power Electrodes and Batteries", and filed on Mar. 25, 2008, which is incorporated herein by reference.

BACKGROUND

The volumetric and gravimetric utilization of active materials in current lithium rechargeable batteries is much less than 50%, due to several factors. Particulate-based electrodes currently used in lithium rechargeable batteries are prepared by blending of a starting powder with polymer binder, solvent, and conductive additive powders such as carbon. The blended mixture is then coated onto metal foil current collectors, dried and calendared under high pressure to obtain a densified coating. These electrodes have poor packing density of the active material, typically less than 60% by volume, and for adequate rate capability the open porosity is typically 30%-40% by volume. A substantial fraction of the electrode volume is also occupied by polymer binders that are introduced to improve processing of the electrodes, and carbon additives that are added to improve electronic conductivity of the electrode. Carbon additives are especially necessary in electrodes that use poorly electronically conducting compounds such as intercalation oxides and polyanion compounds. This is because the powder particles of such compounds, when compacted, tend to form highly resistive "point" contacts between the hard non-deforming particles, resulting in a poorly conducting network. These electrode additives have low specific gravity and thus occupy substantial volume.

Furthermore, transport of lithium ions and electrons in such electrodes is poor and requires relatively thin electrodes, usually less than 150 micrometers thick, in order to achieve complete utilization of the active material. The thin laminate structure of such rechargeable batteries necessitates large fractions of non-storage materials including binders, conductive additives, current collector foils, separator films, and electrolyte, leading to the aforementioned poor volumetric and gravimetric utilization. In high power batteries, the thermal conductivity of electrodes should also be high to prevent excessive heating during cycling that causes degradation of energy and power and limits the life of the battery. Particulate-based electrodes have poor thermal conductivity since heat must be transported from particle to particle through narrow point contacts. These limitations are further exacerbated in positive or negative electrodes that use intercalation oxides or polyanion compounds such as phosphates or sulfates, since such compounds have poor thermal conductivity.

Another aspect limiting the utilization of traditional battery structures is the requirement that each electrode is connected to a common terminal. In a wound cell, the point of connection is through a tab extending from the side of each electrode. The volume and surface area of this tab limits the amount of current that can flow through the tab and be accessible to the device.

Thus it is of value to have an electrode that has a high packing density of the active material, fast electron and ion transport kinetics, high thermal conductivity, and that can be prepared as a thick electrode while still having high electrochemical utilization.

International Patent Publication No. WO 08/153749, filed May 23, 2008 to Chiang et al., entitled "Batteries and Electrodes for Use Thereof" which is incorporated by reference in its entirety generally relates to batteries or other electrochemical devices, and systems and materials for use in these, including novel electrode materials and designs. The publication further discloses batteries having high power and minimal volume.

SUMMARY

This document describes several detailed embodiments, including electrode materials, cell materials, cell designs, fabrication methods, and achievable specific and volumetric energies for the devices of the invention.

The following features of a battery are provided:
- Co-fired electrode-separator structures for rechargeable batteries.
- Rechargeable lithium batteries utilizing said co-fired electrode structures with high volumetric and gravimetric utilization of active material providing high energy density and specific energy, or high power density and specific power. The designs are useful in portable electronic or wireless communications devices, power tools, hybrid electric vehicles (HEV), plug-in electric vehicles (PHEV), fully electric vehicles (EV), back-up power supplies, storage batteries for energy harvesting systems, or power quality improving systems including frequency regulation systems for power utilities.
- Bipolar cell designs using sintered positive and negative electrodes or co-fired electrode-separator structures that provide improved thermal conductivity and safety.

Electrodes and energy storage devices are provided that are able to meet or exceed specific energy of 300Wh/kg and specific power of 600 W/kg (i.e., ~2 C discharge rate of operation).

In one aspect, a subassembly for use in an electrochemical device is described. The subassembly comprises (a) a first electrode and (b) a separator or a first current collector or both. The first electrode is bonded to the separator or the first current collector or both. The term bonded is used as it is understood in the art, particularly the art of electrochemistry and electrochemical devices. For example, bonded indicates a tight connection between materials, which may include, though not necessarily does include, chemical or physical bonds. "Bonded" is used to also indicate that the materials become fused.

In some embodiments, the first electrode is thermally bonded to the separator or the first current collector or both. By thermally bonded, what is indicated is that the materials become bonded or fused through a process involving the application of heat.

In some embodiments, the subassembly is a sintered subassembly.

In another aspect, a subassembly for use in an electrochemical device is described. The subassembly includes (a) a first sintered electrode and (b) a sintered separator or a first current collector or both. The first sintered electrode is bonded to the sintered separator or the first current collector or both.

In a further aspect, a subassembly for use in an electrochemical device includes (a) a first electrode and (b) a separator or a first current collector or both. The subassembly is produced by (i) combining the first electrode with the separator or the first current collector or both and (ii) heating the first electrode and the separator or the first current collector or both under conditions effective to form a sintered sub-assembly.

In yet another aspect, a further subassembly for use in an electrochemical device includes (a) a first sintered electrode and (b) a sintered separator or a first current collector or both. The subassembly is produced by (i) combining the first sintered electrode with the sintered separator or the first current collector or both, and (ii) heating the first sintered electrode and the sintered separator or the first current collector or both under conditions effective to form a sintered sub-assembly.

In one embodiment, an electrochemical device is described and includes
  (a) a positive electrode in electronic contact with a positive electrode current collector, the positive current collector in electrical connection with an external circuit;
  (b) a negative electrode in electronic contact with a negative electrode current collector, the negative current collector in electrical connection with an external circuit;
  (c) a separator positioned between the positive electrode and the negative electrode; and
  (d) an electrolyte in ionic contact with the positive and negative electrodes.

The positive electrode or the negative electrode and the separator include a sintered subassembly. In some embodiments, the mass fraction of inactive materials in the device is less than about 50%. In some embodiments, the specific energy of the device is greater than about 300 Wh/kg at a power density of greater than about 600 W/kg.

In another aspect, a process for preparing subassembly for use in an electrochemical device includes:
  (a) combining a first electrode with a separator or a first current collector or both; and
  (b) heating the first electrode and the separator or the first current collector under conditions effective to form a sintered subassembly.

In a further aspect, a bipolar cell is described. The bipolar cell includes a plurality of stacked electrochemical cells, where electrochemical cells are joined in series. Each of the stacked electrochemical cells includes:
  (a) a positive electrode in electronic contact with a positive electrode current collector, the positive current collector in electrical connection with an external circuit;
  (b) a negative electrode in electronic contact with a negative electrode current collector, the negative current collector in electrical connection with an external circuit;
  (c) a separator positioned between the positive electrode and the negative electrode; and
  (d) an electrolyte in ionic contact with the positive and negative electrodes; wherein the positive electrode and the negative electrode of each stack comprise a sintered electrode.

In some embodiments, the first current collector and the separator are bonded to opposite surfaces of the first electrode. In some embodiments, the subassemblies described herein include a second electrode and the first and second electrodes are bonded to opposite surfaces of the separator. In some embodiments, the second electrode and the first electrode have a thermal bond to opposite surfaces of the separator and the second current collector and the separator are bonded to opposite surfaces of the second electrode (e.g., FIG. 1). In a given subassembly, the first and second electrodes are each independently sintered or not sintered.

In some embodiments, the sintered subassemblies described herein are at least about 200 μm in thickness.

In some embodiments, the thickness of the electrodes and sintered subassemblies described herein varies by less than 25% from the mean thickness. That is, the length of the minimum dimension of the electrode or subassembly across its length and width is substantially uniform, without significant variations in thickness. In some embodiments, the variation in thickness is less than 20%, less than 15%, or less than 10% from the mean thickness.

BRIEF DESCRIPTION OF THE DRAWING

The invention is described with reference to the following drawings that pre presented for the purpose of illustration only and are not intended to be limiting of the invention.

FIG. 3a is a schematic representation of a high energy bilayer cell design incorporating a thick monolithic electrode.

FIG. 3b is a schematic representation of the repeat unit of a multilayer cell, depicting a sintered cathode with a current collector and bounded by a negative electrode on each face.

FIG. 3c is a schematic representation of an exemplary multilayer stacked cell configuration.

FIG. 4a is a photographic representation of an electrode having 85% density (top-down view).

FIG. 4b is a photographic representation of the side-view of the electrode shown in FIG. 4a.

FIG. 4c shows charge-discharge curves over the $6^{th}$ and $7^{th}$ cycles for the $LiCoO_2$ electrode shown in FIGS. 4a and 4b.

DETAILED DESCRIPTION

Figure 1:
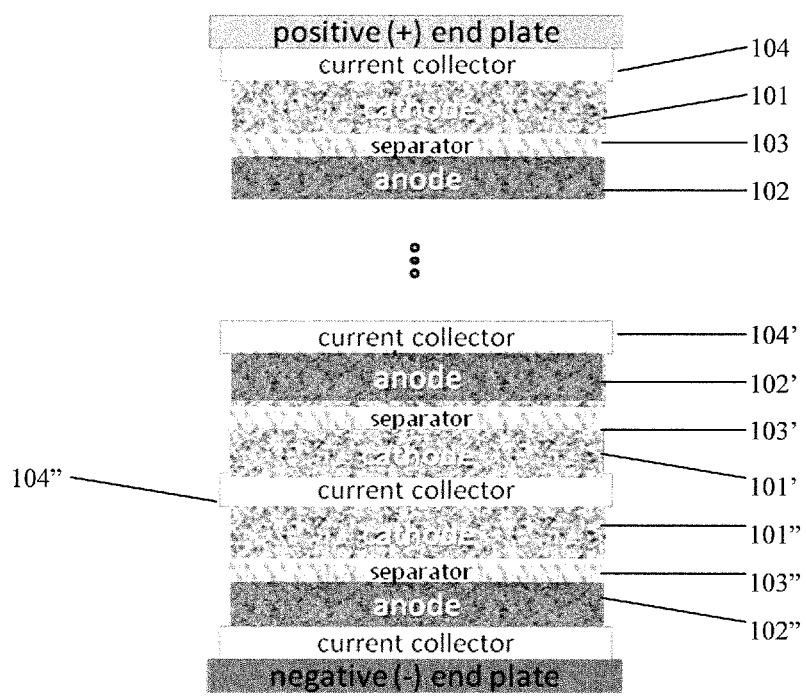
FIG. 1 is a cross-sectional view of a bipolar cell.

In some embodiments, the cells and devices described herein utilize monolithic high density sintered electrodes. Such electrodes minimize the parasitic volume and mass occupied by inactive components and cell packaging of traditional electrodes, thereby resulting in cells and devices having exceptional mass and volume efficiency.

A significant and unexpected discovery is that, for cathodes having a limited crystallographic volume change during electrochemical cycling, sintered macroscopically thick (>200 μm), high density (>65% of theoretical) electrodes can be repeatedly cycled at practical rates without mechanical or electrical failure. The percolating electrode network provides for high electronic conductivity in the absence of conductive additives and binders. This innovation enables new cell designs of previously unattainable volumetric and gravimetric utilization. In one embodiment, the cells and devices described herein include a liquid or gel electrolyte to obtain rapid kinetics throughout the electrodes described herein (e.g., thick sintered electrodes or electrode-separator subassemblies). In other embodiments a solid polymer electrolyte is infused through the electrode and cells.

Electroactive compounds that exhibit high energy and/or high rate are useful for the mass-efficient cell designs described herein. In some embodiments, as described in more detail herein, at least one electrode material includes metal oxide or metal fluoride compounds. Such compounds have intrinsic crystallographic and physical properties that are suited to this design approach. Moreover, it is believed that in nanostructured form, these compounds provide the desired electrochemical performance. In one embodiment, metal fluoride compounds offer relatively higher intrinsic energy density and improved safety.

The cell architecture also integrates innovative negative electrode and separator features. In some embodiments, the electrolyte or separator layer includes a solid ionically-conducting barrier film such as a film of Lipon (lithium phosphorus oxynitride) or a solid polymer electrolyte, used with a metallic lithium anode. This combination is effective in suppressing lithium-dendrite related failures. Other barrier coatings and/or electrolyte additives capable of suppressing lithium dendrite formation may be used.

As used herein, "cathode" and "positive electrode" are used interchangeably. Also as used herein, "anode" and "negative electrode" are used interchangeably.

Also, as used herein, "particle size" refers to the aggregate particle size. Aggregate particle refers to branched chains of fused primary particles. Aggregate particle size refers to the average maximum dimension of the aggregate particles and not the primary particles making up the aggregate particle. Aggregates are further distinguished from agglomerates, which are loose associations of aggregates that can be readily dispersed.

By "nanoscale," it is meant less than 500 nm, and preferably less than 100 nm.

The present invention provides a manufacturable, safe, lithium rechargeable battery technology of unprecedented mass and volume efficiency. In order to minimize the parasitic volume and mass occupied by inactive components and cell packaging, a novel design approach using monolithic high density sintered electrodes is used (FIG. 3).

In some embodiments, the sintered electrode is a positive electrode. The use of sintered electrodes provides for, inter alia, increased cathode thickness (>200 μm vs. ~100 μm for typical rechargeable battery cathodes) while also having higher volume packing fraction (>65% of the theoretical density of the compound vs. ~55% in typical cathodes). This combination allows the mass fraction of inactive materials to be reduced below 50% at the cell level. In some embodiments, the number of repeat layers in the cell needed for a given cell capacity is reduced relative to the requirements of a typical rechargeable battery cathode. A repeat layer herein refers to a sequence comprising a cathode layer, an anode layer, and the separator between these two layers. For example, in some embodiments, the number of repeat layers is reduced by about a factor of 5. In some embodiments, a cell comprises a single cathode layer and a single anode layer, referred to as a "unicell" having one repeat layer. In another embodiment, the cell has a central layer of one electrode and two outer layers, comprising two repeat layers that are the mirror image of each other, and is referred to as a "bicell." In other embodiments, two to 100 repeat layers are used, but in any instance the thicker electrodes permit the use of fewer repeat layers while achieving the same capacity as a conventional wound or stacked cell. In some embodiments, two to 75 repeat layers, two to 50 repeat layers, two to 25 repeat layer or two to 15 repeat layers are used. Because the number of layers is reduced, so is the mass associated with the inactive components of the cell (e.g., current collector foils, separators, electrolyte, binders and conductive additives, tabs, and packaging). Accordingly, in some embodiments, the mass fraction of inactive materials is less than about 40%, less than about 30%, less than about 20% or less than about 10% at the cell level. In some embodiments, the mass fraction of the inactive materials is between about 10% to about 40%, between about 10% to about 30%, or between about 20% to about 30%.

Figure 2:
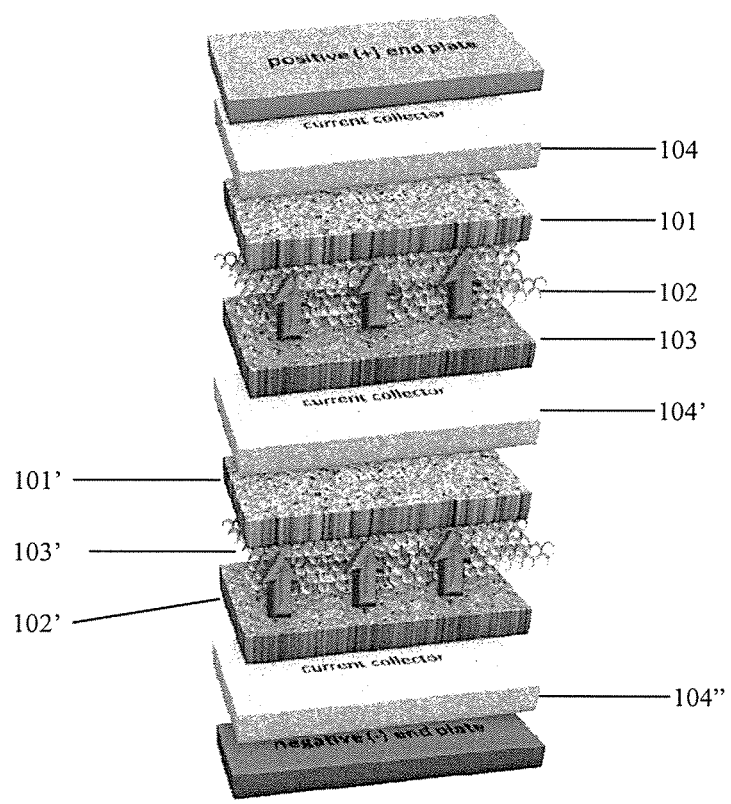
FIG. 2 is an exploded view of a bipolar cell.

In one embodiment, a sintered electrode, e.g., cathodes 101, 101', 101" . . . and anodes 102, 012', 102" . . . , in FIGS. 1 and 2, has at least 50% by volume of one or more lithium storage compounds, and in addition has continuous or open porosity in which an electrolyte phase is introduced. The electrolyte phase may be a liquid electrolyte, a gel electrolyte, or a solid polymer or solid inorganic electrolyte. By forming a sintered structure of the lithium storage compound, the contacts or "sinter-necks" that form between powder particles during the firing process provide for a larger cross-sectional area joining particles than occurs in a conventional particle-based electrode. The larger contact area provides improved electrode strength, improved electronic or ionic conductivity, improved thermal conductivity, and higher packing by volume while still having adequate electrolyte-filled porosity for charging and discharging of the battery.

An exemplary high energy cell design incorporating a thick monolithic electrode is shown in FIG. 3. FIG. 3a depicts an exemplary bilayer cell. FIG. 3b depicts the repeat unit of a multilayer cell in which the sintered cathode has a current collector attached at its perimeter and is bounded by a negative electrode at each face, allowing a greater cathode thickness than in the left image. FIG. 3c depicts an exemplary multilayer stacked configuration.

In another embodiment, the stacked prismatic designs described herein (e.g., FIG. 3) are packaged in polymeric packaging systems. Such polymeric systems are in use for rechargeable lithium batteries for portable devices and are currently being developed for large high power batteries for automotive and other applications. An advantage to this packaging approach is significant mass reduction compared to metal packaging.

FIG. 4 depicts the capability of an exemplary sintered electrode described herein. Up until now, the "electrochemical grinding" phenomenon pervasive in battery materials due to the volume changes taking place during cycling have made it inconceivable that monolithic sintered electrodes could function in a battery system.

In FIG. 4, a sintered electrode of 0.7 mm thickness which was infused with electrolyte and cycled against a lithium metal anode. FIG. 4a shows a top-down view of an LiCoO$_2$ electrode with 85% density. As shown in FIG. 4a, the electrode dimensions are 1.8×2.4 mm. FIG. 4b is an electron micrograph depiction of the electrode, showing its height of 0.6 mm. FIG. 4c is a plot of the $6^{th}$ and $7^{th}$ cycles. The results demonstrate that the electrode is capable of repeated cycling without mechanical or electrical failure while obtaining high reversible capacity. The electrode exhibited nearly 100% utilization (130 mAh/g) at a C/20 rate, and showed negligible capacity fade and no detectable mechanical damage after 20 cycles. Furthermore, since Li$_{1-x}$CoO$_2$ like other compounds in this family is an excellent electronic conductor when partially delithiated, the electrode does not need a separate conductive additive to function. In some embodiments, high utilization are achievable (e.g., rates up to 2 C) in this design. For example, in some embodiments, the electrodes and assemblies described herein exhibit at least about 75% utilization at a C/20 rate, a C/10 rate, a C/4, 1 C, 2 C or 5 C. In other embodiments, the electrodes and assemblies described herein exhibit at least about 80% utilization at a C/20 rate, a C/10 rate, a C/4, 1 C, 2 C or 5 C. In further embodiments, the electrodes and assemblies described herein exhibit at least about 85% utilization at a C/20 rate, a C/10 rate, a C/4, 1 C, 2 C or 5 C. In some embodiments, the electrodes and assemblies described herein exhibit a utilization of about 75%-100% at a C/20 rate. Still higher performance is obtained for nanostructured materials.

The tolerable volume change in a given sintered electrode depends on the mechanical properties of the materials involved, the concentration gradients developed during use, and the specific microstructure or nanostructure. Electrodes are designed from the materials and nano-structure on up to provide mechanical robustness during use, both through materials selection and reduction of the microstructural length scale to increase the strain-to-failure of the materials. Thus, in some embodiments, the sintered electrodes and subassemblies described herein incorporate innovative nanoscale and nanocomposite cathode materials. In other embodiments, the sintered electrodes and subassemblies described herein also incorporate a unique separator approach. In still further embodiments, the sintered electrodes and subassemblies described herein also incorporate anode materials of low mass and high specific energy. These material selections provide for enable highly mass- and volume-efficient rechargeable cells.

In some embodiments, the rechargeable cells described herein have a volume of at least about 56 $cm^3$ (i.e., equivalent to a D cell) while attaining >50% of the theoretical specific energy of the active materials taken alone, and an absolute specific energy >300 Wh/kg at a power density of >600 W/kg. By comparison, the leading rechargeable lithium batteries on the market today realize 250 Wh/kg, or about 20% of the theoretical limit. Accordingly, in some embodiments, rechargeable batteries are provided that deliver higher capacity than existing primary (single use) lithium batteries (such as the BA 5590 used by the U.S. military).

In one embodiment, the cell includes a prismatic format containing a stack of at least 3 repeat layers, but where in the layers are arranged so that the voltages of the repeat layers are at least partially additive. That is, cells comprising each repeat layer are joined in series as in a bipolar cell design, producing a complete cell of higher voltage than the working voltage of the electrochemical couple used in the cell. In another embodiment, the rechargeable cell is packaged using conventional polymer packaging technology.

The use of a monolithic electrode provides new design possibilities. In one embodiment the cathode is the monolithic sintered electrode rather than the anode because cathode materials generally have poorer electronic conductivity than anodes. Therefore the cathode stands to gain more from the increase in electronic conductivity of a sintered cathode that essentially acts as its own current collector. The opposite arrangement also is contemplated, as are arrangements in which both electrodes are sintered. Moreover, in some embodiments, the electrodes are cofired or sintered with other cell components, such as the separator and/or the current collector. For example, a positive electrode, a separator and a positive current collector are cofired to form a single structure, with the individual components bonded to each other. Similarly, a negative electrode, a separator and a negative current collector are cofired to form a single structure. In some embodiments, the two electrodes are cofired with the separator. In some embodiments, one current collector is included in the cofired structure.

Thus, in some embodiments, the sintered electrode forms a sub-assembly of a battery by having a separator, e.g., 103, 103', 103" in FIGS. 1 and 2, attached to its surface. In some embodiments, the separator comprises an inorganic compound, an inorganic-organic composite or blend, or an organic compound. In some embodiments, the separator comprises a particulate material that is applied to the sintered electrode and then heat treated. In some embodiments, the separator comprises a sintered particulate ceramic. In some embodiments, the separator comprises a sol-gel coating that is optionally fired after coating. In some embodiments, the electrode and the separator are co-fired.

In some embodiments, a current collector e.g., 104, 104', 104" in FIGS. 1 and 2, is cofired with the electrode or electrode and separator to produce a subassembly wherein the current collector is thermally bonded to the electrode.

The basic high energy battery design enabled by monolithic sintered cathodes is illustrated in FIG. 3. In some embodiments, cathode layers are fabricated on the order of 1 mm thick, each half-thickness of which may be fully utilized with an anode layer positioned on either side during operation of the cell. In one embodiment, illustrated in the multilayer cell of FIGS. 3b and 3c, the cathode current collecting tabs are bonded to the electrode perimeter. The bonding is accomplished using, for example, metal-metal bonding to a sputtered metal film on the cathode edge, or the use of a conductive adhesive. As shown in FIG. 3, in some embodiments, the anode design consists of a layer of copper foil, coated on both sides with a lithium metal film or a film or coating that comprises a metal alloy anode. The film is coated using standard coating techniques. For example, in one non-limiting embodiment, the film is a lithium foil pressure-laminated to the copper. In another embodiment, the film is evaporated lithium. In embodiments utilizing a lithiated cathode, the use of lithium metal at the anode is primarily as a nucleation aid to facilitate lithium metal deposition upon charging, and to accommodate irreversible lithium losses during cycling. When an anode-active metal alloy is used, said alloy stores and releases lithium during cycling of the battery. Such an alloy may be deposited by sputtering, evaporation, pressure lamination, thermal spray coating, or as a coating comprising a powder of the metal alloy.

As described above, the sintered electrodes and electrode subassemblies described herein enable thicker electrodes than traditional, particle-based electrode designs. In some embodiments, a single sintered electrode layer has a layer of the opposing electrode at each face so that substantially one-half of the thickness of the sintered electrode exchanges ions with each of the opposing electrode layers. In such instances the active layer thickness of the sintered electrode is its half-thickness. In other embodiments the sintered electrode layer is attached to a current collector such as a metal foil, and the active layer thickness is the entire thickness. In some embodiments the active layer thickness of the electrode or electrode subassembly is greater than about 200 μm. In other embodiments, the active layer thickness is greater than about 400 μm. In further embodiments, the active layer thickness is greater than about 600 μm. In some embodiments, the active layer thickness is about 200 μm to about 1000 μm.

The sintered electrodes and electrode subassemblies are high density, particularly relative to traditional, particle-based electrode designs. In some embodiments, the packing density of the active material is greater than about 65% of the theoretical density of the compound. In other embodiments, the packing density is greater than about 80% of the theoretical density of the compound. Several separator options are contemplated. In one embodiment, the cell is subsequently infused with liquid electrolyte, and uses a conventional porous separator film (e.g., about 20-25 μm thickness). In another embodiment, as a guard against internal shorting due to lithium dendrite formation, a conformal layer of a solid electrolyte compound such as Lipon is deposited on the porous cathode. In some embodiments, the Lipon layer is about 0.5-1.0 μm in thickness. In some embodiments, the separator (e.g., Lipon) layer is about 0.5 μm in thickness, about 0.6 μm in thickness, about 0.7 μm in thickness, about 0.8 μm in thickness, about 0.9 μm in thickness, or about 1 μm in thickness. Sputter-deposited Lipon films can coat porous cathodes with a high degree of conformality. Moreover, films in this thickness range typically contribute less than 0.3V potential drop during cycling at current densities corresponding to a 2 C rate for an 0.5 mm cathode thickness. In some embodiments, the films contribute less than 0.2V potential drop during cycling, less than 0.15V potential drop during cycling, or less than 0.1V potential drop during cycling. Furthermore, in some embodiments, the lithium metal anode is directly laminated to the coated cathodes. Such configurations include, for example, Lipon films of about 0.5-1.0 µm thickness. In some embodiments, the LiPON films are about 0.5 µm thick, about 0.6 µm thick, about 0.7 µm thick, about 0.8 µm thick, about 0.9 µm thick, or about 1 µm thick. In some embodiments, the Lipon films are substantially pinhole-free. In some embodiments, an additional insulating separator is included in the cell or device configuration. In some embodiments, conventional separators are used. In other embodiments, coated nanocomposite separators may be used. (See, e.g., U.S. patent application Ser. No. 12/196,203, filed Aug. 21, 2008, entitled Separator for Electrochemical Cell and Method for its Manufacture, which is hereby incorporated by reference in its entirety.) Nanocomposite separators are desirable given their relatively enhanced safety characteristics.

In some embodiments, a sintered electrode is first sintered or partially sintered, then a separator layer is applied to its surface, and the subassembly is then co-fired to bond the two layers and form a subassembly of the electrochemical cell. Such a co-fired separator layer may comprise a ceramic or glass compound that is electrically insulating and electrochemically inert, including for example alumina, silica, zirconia, silicate glasses, or other such compounds. In such an instance, the co-fired separator layer may be porous after firing. In other instances the co-fired separator may comprise an ionically conductive but electronically insulating compound such as lithium phosphorus oxynitride, lithium iodide, crystalline or glassy lithium phosphate, and the like. In such an instance, the co-fired separator may be porous or substantially dense after firing. In either instance, the co-fired separator layer has a thickness of about 1 micrometer to 200 micrometers. In some embodiments, the co-fired separator layer has a thickness of about 1 µm to about 150 µm, about 1 µm to about 100 µm, about 1 µm to about 75 µm, about 1 µm to about 50 µm, about 1 µm to about 25 µm, or about 1 µm to about 10 µm.

In other embodiments, a sintered electrode is co-fired with a metallic current collector, said current collector being applied to a face or to one or more edges of the sintered electrode. In some embodiments the co-fired current collector comprises a metal foil, or a metal powder that is sintered during firing. A positive current collector co-fired with the electrode may comprise aluminum metal foil or aluminum metal powder. A negative current collector may comprise copper foil or copper metal powder. A negative current collector may also comprise aluminum foil or aluminum powder if it is used with an anode-active material that has an average lithium insertion voltage of greater than about 1V when measured vs. Li metal. For example, lithium-titanate spinel has a lithium insertion voltage of about 1.55V vs. Li metal, and may be used with an aluminum current collector. In the instance of metal powder current collectors, the co-fired assembly may be fabricated by preparing a metal powder slurry or suspension similar to metal powder formulations used to fabricate fired resistor or interconnects in ceramic packaging and hybrid circuits, applying the metal powder slurry or suspension to the electrode using screen printing, dipping, spraying, or other such methods, followed by drying, de-bindering, and sintering.

In some embodiments, a co-fired separator or co-fired current collector is applied, in an unfired state, to at least one sintered electrode that is in its unsintered state, and the materials are co-fired together.

In some embodiments, an entire repeat layer having a sintered electrode, a separator layer, and an opposing electrode, which may optionally be sintered, is co-fired together. In some embodiments, a subassembly comprising at least one electrode layer, one separator layer, and one current collector layer are co-fired together. In some embodiments an assembly comprising at least a unicell, at least a bicell, or a multilayer cell, including its separator and current collector layers, is co-fired as a unit. In other embodiments, such co-fired layers, subassemblies, or assemblies, comprise at least an electrode that is in an unsintered or partially sintered state prior to co-firing.

Electrochemical cells and devices incorporating co-fired or sintered subassemblies provide advantages, particularly with regard to the safety and durability of the cell or device. The constituent parts of traditional pouch cells have a tendency to separate over time. To prevent such separation, a minimum amount of stack pressure must be applied to the cell or stack to avoid separation. Because the components of co-fired or sintered subassemblies are bonded, they are not susceptible to separation as a result in inadequate stack pressure. Thus, bonding between component parts of the cell or subassembly provides for a more durable device that is able to withstand physical stresses of use (e.g., stresses resulting from the portability of electronic devices).

Moreover, the use of sintered subassemblies in cells and devices allows for reduced amount of current collector and separator material to be used. For example, in some embodiments, the current collector primarily contacts the perimeter of the electrode (e.g., FIG. 3b), rather than the entire surface area of one side of the electrode, as in traditional devices. Because the entire sintered electrode is conductive, amount of contact between the electrode and the current collector required to obtain a particular amount of energy or current is reduced. For example, in some embodiments, the current collector is primarily confined to the perimeter of the first electrode. For example, in some embodiments, rather than being in the shape of a solid rectangular, the current collector is in the shape of a border or frame. In some embodiments, the perimeter area of the portion of the first electrode that is bonded to the first current collector is less than about 50% of the total area of the electrode which it contacts. For example, the bonded area is less than 45%, less than 40%, less than 30%, less than 25%, less than 20%, less than 15%, or less than 10% of the total area of the electrode which it contacts.

As an example of such a fabrication procedure, a powder of a cathode compound such as $LiCoO_2$ is first consolidated into the shape of an electrode. Then a powder suspension of a separator compound such as alumina or silica is applied to one face of the unfired cathode. An aluminum powder current collector suspension is applied to the other face, or to the edges, of the unfired cathode. The current collector—cathode—separator subassembly is then cofired together.

In any of the preceding co-firing steps referred to, the formulations of the powder suspensions and the formulation and pressed density of the sintered electrodes, are adjusted using methods well-known to those skilled in the art of co-firing electronic and structural components to achieve a co-fired product that is substantially defect free. The firing schedule, which includes firing temperatures, times, and heating and cooling rates, is also adjusted using methods well-known to those skilled in the art of co-firing. For example, in some embodiments, the components are pressed and fired at a temperature of at least about 775° C. in air or Argon for at least about 1.5 hours. In some embodiments, the sintering process is carried out at temperatures of about 700° C., 750° C., 800° C., 850° C., 900° C., 950° C., 1000° C., 1050° C., 1100° C., or greater. In some embodiments, the electrodes and subassemblies are fired for about 1 hour, about 1.5 hours, about 2 hours, about 2.5 hours, about 3 hour, about 5 hours or about 10 hours. Firing is conducted in inert, oxidizing, or partially oxidizing gas atmospheres to aid the removal of binders and residual organics, to achieve desired densification rates, and to prevent undesirable oxidation or reduction of the compounds used. Common defects to be avoided during co-firing include cracking or delamination of one or more of the component layers, warping due to differential shrinkage of components during the firing process, cracking or warping due to differential thermal expansion between components, or changes in composition or phase of the constituent compounds used in the electrode, separator, or current collector.

The mass utilization of the cells, subassemblies and devices described herein depends on the specific physical and electrochemical properties of the active materials used.

Figure 5:
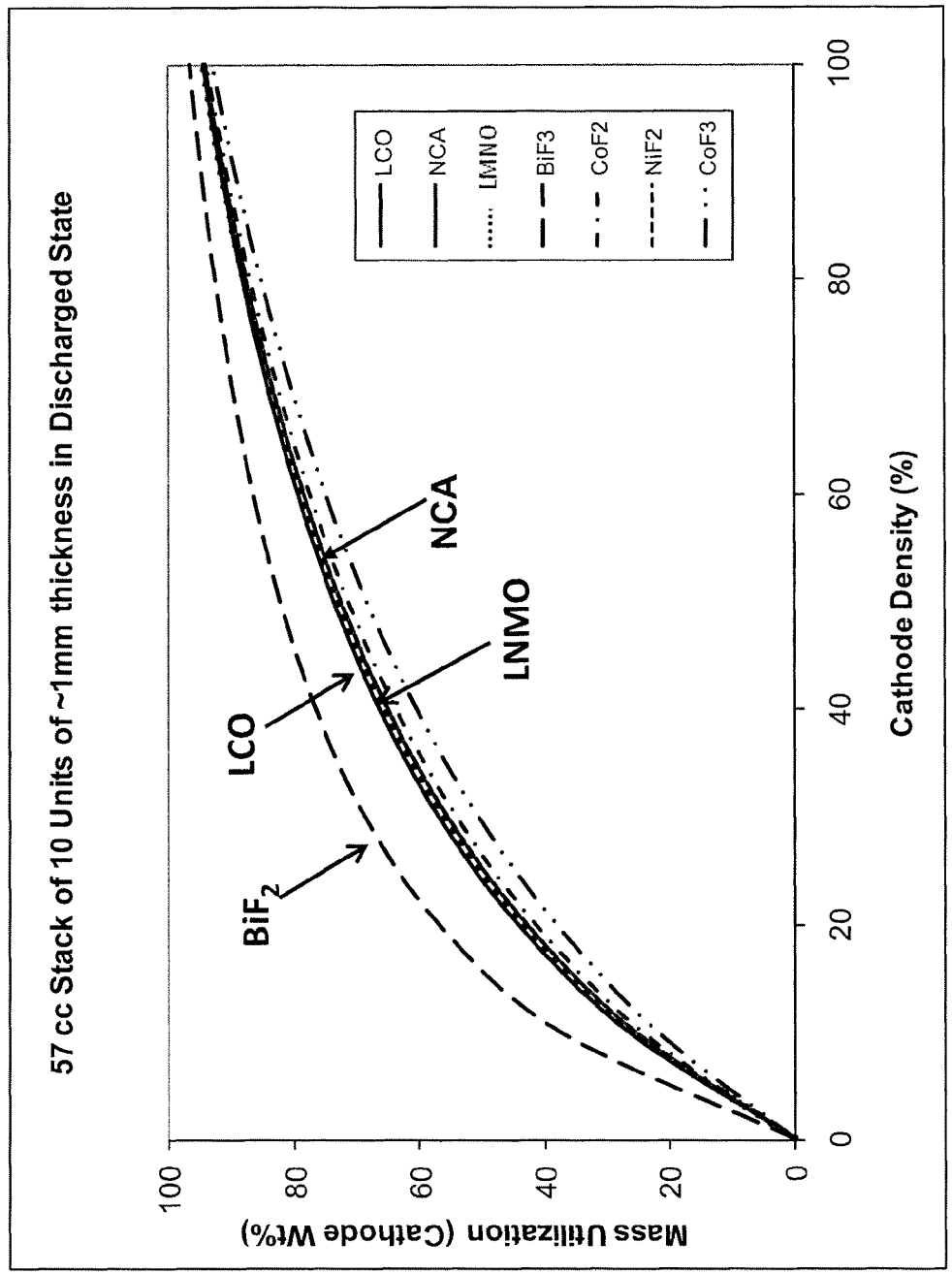
FIG. 5 is a graph showing cathode utilization as a function of the density of the sintered electrode, for five difference electroactive materials.
Figure 6:
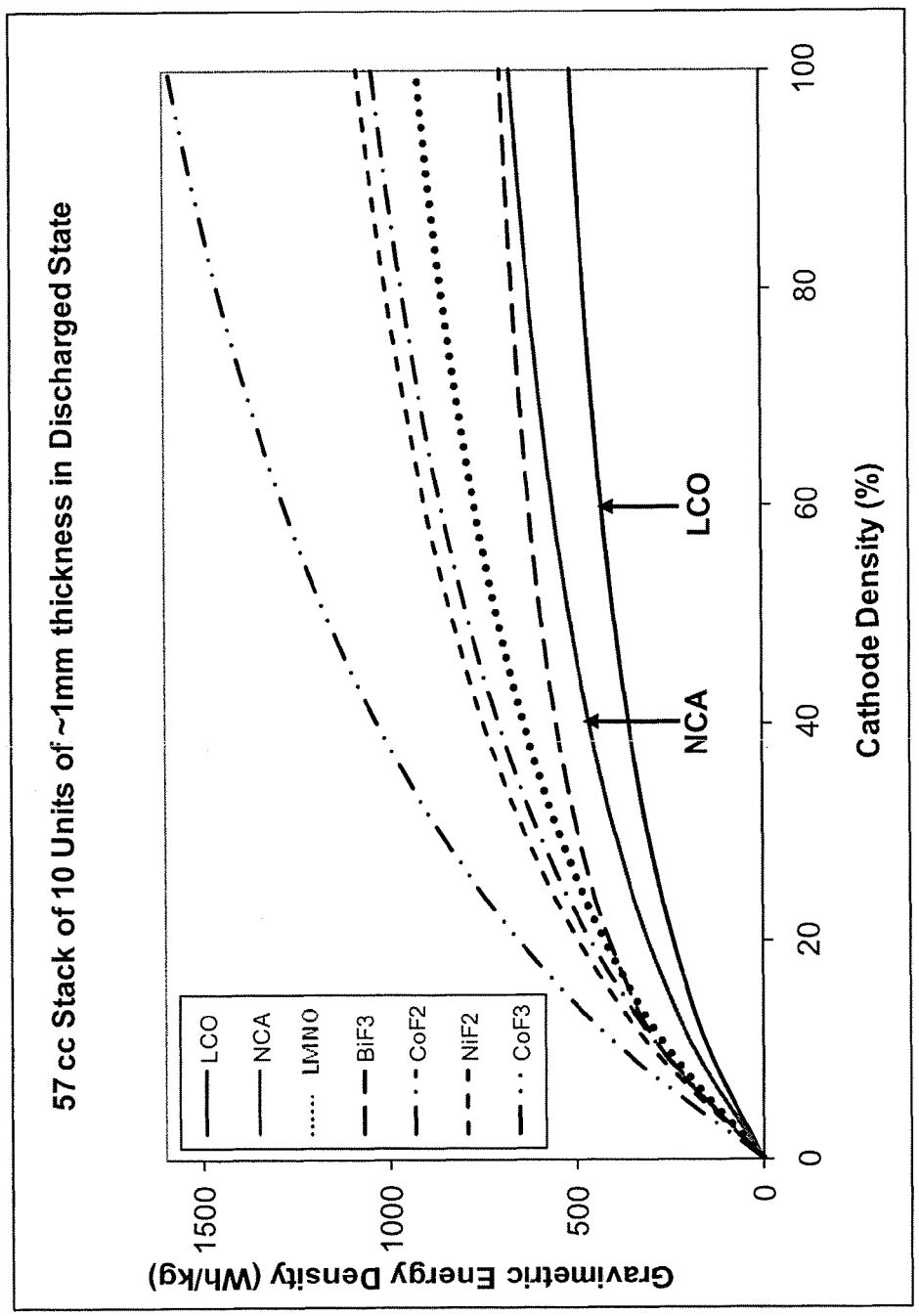
FIG. 6 is a graph showing the specific energy as a function of density for five different cathode compounds.
Figure 7:
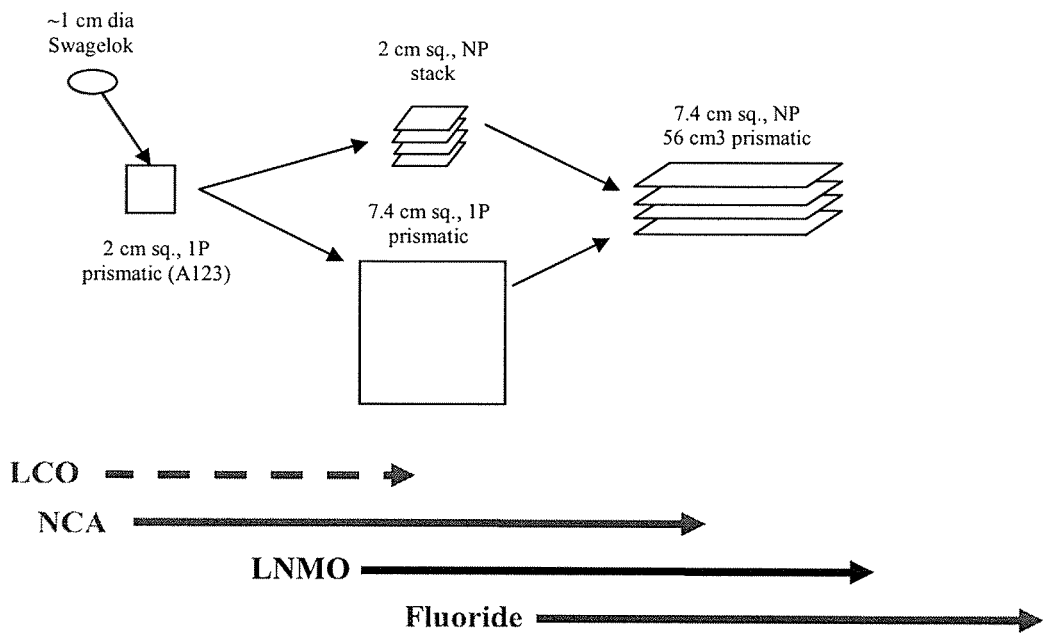
FIG. 7 is a schematic depiction of developmental stages for scaling up the cell designs described herein, including building up of a stacked bipolar cell array.

First, to illustrate the potential of this cell design to reach the mass utilization and specific energy density targets of this program, FIG. 5 depicts calculated results for certain cathode materials described herein, used with lithium metal as the negative electrode. When used with lithium metal as the anode, the mass fraction of active material is dominated by the cathode. For example, FIG. 5a depicts cathode utilization as a function of the density of the sintered cathode, showing the sintered cathode density at which certain mass utilization of the cell by active material is achieved. FIG. 5 demonstrates that several cathode compounds can reach 80% mass utilization at a sintered density of only about 60%. At 85% sintered density, where cathodes were demonstrated using $LiCoO_2$, the mass utilization is about 90%. Here the notation LNMO refers to the electroactive compound $Li_{1+x}(Ni_{0.5}Mn_{0.5})_{1-x}O_2$. (See, e.g., work by Argonne National Laboratory reported in J. Electrochem. Soc. 154(3) A264-A274 (2007), which is incorporated by reference in its entirety herein). In FIG. 6, the absolute specific energy of the present cell design is shown for several candidate cathodes. Specifically, FIG. 6 depicts the specific energy as a function of the density of the sintered cathode. For example, it is seen that 500 Wh/kg can be reached with LNMO cathode density of only ~23%, while at 60% cathode density corresponding to 80% mass utilization, the absolute specific energy is about 800 Wh/kg. Note that for the relatively large format cells proposed, performance is dominated by the active materials content, with the packaging providing relatively little opportunity for increasing mass utilization.

Accordingly, in some embodiments the electrodes and subassemblies described herein realize as much as 80% active material mass utilization in a completed cell. In other embodiments, the active materials packing density is about 85% of theoretical. In further embodiments, the packing density is about 90% of theoretical. In some embodiments, the material mass utilization of the cells described herein is greater than about 60%, greater than about 80%, or greater than about 90%.

In some embodiments, the electrodes and electrode assemblies achieve mass utilization at the cell level of at least about 60% at a cathode density of about 40%, about 75% at a cathode density of about 60%, or about 80% at a cathode density of about 70%.

In some embodiments, the electrodes and assemblies described herein achieve a specific energy at the cell level of at least about 300 Wh/kg at a cathode density of between about 20% to about 90%, about 20% to about 80%, about 20% to about 70%, about 20% to about 60%, about 50% to about 60%, about 50% to about 70%, about 50% to about 80% or about 50% to about 95%. In some embodiments, the electrodes and assemblies described herein achieve a specific energy at the cell level of at least about 500 Wh/kg at a cathode density of between about 20% to about 90%, about 20% to about 80%, about 20% to about 70%, about 20% to about 60%, about 50% to about 60%, about 50% to about 70%, about 50% to about 80% or about 50% to about 95%.

Conversely, electrodes and assemblies described herein having about 50% cathode density exhibit an absolute specific energy of about 250 Wh/kg, about 350 Wh/kg, about 550 Wh/kg, about 750 Wh/kg, or about 950 Wh/kg. At a cathode density of about 70%, the electrodes and assemblies described herein achieve a specific energy at the cell level of at least about 300 Wh/kg, about 400 Wh/kg, about 600 Wh/kg, about 800 Wh/kg, or about 1000 Wh/kg. In some embodiments, the electrodes and assemblies described herein have an absolute specific energy at the cell level, for about 50% cathode density, of about 250 Wh/kg to about 950 Wh/kg, about 350 Wh/kg to about 750 Wh/kg, or about 450 Wh/kg to about 650 Wh/kg.

Amongst many electrochemical couples for rechargeable lithium chemistry that may be used with the current invention, several embodiments are shown in Table 1. Table 1 provides four embodiments of cathode materials and two embodiments for anode materials. Six couples (underlined) out of the eight possibilities meet or exceed 500 Wh/kg specific energy.

TABLE 1

Specific energy in Wh/kg for cathode (columns) used with two anodes (rows). Underlined values represent electrochemical couples that exceed 500 Wh/kg at 80% mass utilization.

|  | NCA | LNMO | $BiF_3$* | $NiF_2$* |
|---|---|---|---|---|
| Lithium | <u>568</u> | <u>777</u> | <u>574</u> | <u>919</u> |
| Si alloy | 377 | <u>513</u> | 363 | <u>509</u> |

*assumes pre-lithiated metal fluoride with 20 wt % matrix to enhance conductivity In some embodiments, the sintered electrode is selected for its tolerance to microcracking during electrochemical cycling. The sintered electrode can tolerate a degree of microcracking, as in the manner of thermal shock resistant ceramics, but does not lose contiguity of its sintered particle network and does not suffer macroscopic cracking. The sintered electrode is designed to be damage-tolerant at the expense of high mechanical strength. Suitable materials and materials processing parameters can be selected from the art of ceramic materials for thermal shock resistant applications.

In one embodiment, the sintered electrode also comprises one or more phases added to provide for improved sintering of the electrode. Exemplary additives may be inorganic compounds including metals, metal alloys, or ceramics, or may be one or more polymers or organic compounds. The additives may be a solid or glass or liquid at the firing temperatures used in sintering. For example, an oxide cathode powder may be mixed with aluminum powder, pressed and fired to a temperature above ambient temperature but below the melting point of aluminum (660° C.) in order to create a metal-ceramic bond without substantially decomposing the $LiCoO_2$. A silicate or borosilicate glass powder may be used as a sintering aid to bond an oxide cathode powder and improve densification or the extent of sinter-neck formation between particles. A mixture of PVdF and carbon, or a conductive polymer such as Bayer's PEDOT, or a block-copolymer with low glass transition temperature ionically conductive blocks mixed with higher glass transition temperature structural blocks, may be used to bond the oxide powder at a relatively low firing temperature.

In some embodiments, the additive phase(s) is a conductive material that improves the electronic or ionic conductivity of the sintered electrode. In some embodiments, the additive phase forms a continuous or partially continuous coating on the pore surfaces of the sintered electrode, e.g., the internal surfaces of the electrode. In some embodiments, this coating is carbon or a metal that is electrochemically stable under the use conditions of the cell. For example, aluminum is suitable as a positive electrode additive and copper or titanium as a negative electrode additive. In some embodiments, the pore surface coating forms naturally during firing of the electrode. In some embodiments, the pore surface coating is applied after the electrode has been sintered. In some embodiments, the pore surface coating is applied by vapor deposition. In some embodiments, the pore surface coating is applied by infiltration of a liquid, followed by drying and optionally by a firing process.

In some embodiments, the additive phase(s) improves the strength or fracture toughness or damage tolerance or resistance to fatigue upon thermal cycling or electrochemical cycling of the electrode. In some embodiments, this phase is a ductile solid including but not limited to metals, metal alloys, and polymers, including the conductive additive materials described above. For example, aluminum metal and copper metal improve the strength and fracture toughness of a sintered oxide cathode and anode respectively. Polymers are typically more ductile than ceramics and metal and can improve the strength and fracture toughness of sintered electrodes and subassemblies.

In some embodiments, the porosity of the sintered electrode or subassembly is controlled. In some embodiments, the pore fraction, pore shape, pore topology, and spatial distribution of porosity in the sintered electrode is selected to improve the electrochemical and mechanical function of the electrode. In some embodiments, a removable or "fugitive" material is added to the electrode in order to form a desired pore configuration. In some embodiments, the removable material is ice, or an inorganic or organic compound or polymer, including an alkali halide, naphthalene, latex, polyvinyl alcohol, polyvinyl acetate, or polystyrene that is subsequently removed by sublimation, pyrolysis or chemical dissolution, or carbon particles that are removed by oxidation at elevated temperature, or glass or metal fibers that are removed by chemical dissolution. In some embodiments, pore channels of relatively high length/diameter aspect ratio are introduced into the sintered electrode by incorporating fibers of the removable or partially removable material into the compacted powder electrode prior to sintering. In some embodiments such fibers comprise polymer or glass or carbon fibers. In some embodiments, the porosity is graded through the thickness of the electrode from the current collector side to the separator interface in order to provide higher utilization or power of the electrode.

In some embodiments, the sintered electrode or subassembly includes an energy storage compound that increases its electronic or ionic conductivity after it is electrochemically cycled. This is generally beneficial and can be especially beneficial if cycling introduces some mechanical damage or loss of connectivity in the electrode. Consider for example positive electrode materials such as $LiCoO_2$ or $LiMPO_4$ or $Li_4Ti_5O_{12}$, where M comprises a metal. When such compounds are selected or designed to be able to accommodate a substantial lithium solid solution, the creation of a solid solution results in an increase in the electronic conductivity to the greater multivalency of the transition metals. In the first two examples, which are positive electrode compounds that are generally produced in a highly lithiated state, use in certain electrochemical cells causes them to be partially depleted of Li, even when the cell is fully discharged, due to some irreversible loss of lithium. As a result, the compounds gain in electronic conductivity and are usable in a more highly conductive state after initial electrochemical cycling or cell "formation." In the example of $Li_4Ti_5O_{12}$, this is a negative electrode compound into which lithium is inserted during use. The insertion of lithium likewise increases the electronic conductivity of the compound, improving its function as a sintered electrode.

Exemplary oxide cathodes that are in the same family of "layered" oxides include $LiCoO_2$ and $LiNiO_2$, and exemplary metal fluorides are from the family of conversion or displacement reaction materials. These cathode materials are presently at various stages of technical maturity. NCA and LNMO are higher energy density derivatives of $LiCoO_2$.

NCA ($LiNi_{0.8}Co_{0.15}Al_{0.05}O_2$) is a layered oxide and a commercially mature cathode. This material has a larger volume change upon charging compared to $LiCoO_2$ (−6% vs. +2%) which may influence mechanical durability of sintered cathodes, and reduced safety in the charged state, especially with reduced particle sizes. However, an advantage of the present electrode design is that the reduction in specific surface area that accompanies sintering helps to mitigate safety issues that typically accompany particle size reduction.

The layered oxide compound $Li_{1+x}(Ni_{0.5}Mn_{0.5})_{1-x}O_2$ where x is between zero and about 0.3 (LNMO) offers up to 25% higher energy than NCA, and has recently demonstrated reasonable cycle life and rate capability in laboratory experiments. This compound has a low volume expansion upon charging (+3%) making it attractive for the present design. This oxide is produced and scaled up using the method described in the process reported by researchers at Argonne National Laboratory (*J. Electrochem. Soc.* 154(3) A264-A274 (2007)) which is hereby incorporated by reference in its entirety. This process uses $Ni_{0.5}Mn_{0.5}(OH)_2$ precursor that is coprecipitated under alkaline conditions in a stirred tank reactor. The hydroxide is then mixed with a slight excess of $Li_2CO_3$ and calcined at 1000° C. for 12 h in air.

In other embodiments, the positive electroactive material is metal fluoride. The metal fluorides have significant attributes as safe, very high capacity cathode materials.

Exemplary metal fluorides include $BiF_3$, $CoF_2$ and $NiF_2$. These materials can be prepared in nanocomposite form as has been successfully done with $FeF_3$ and $BiF_3$. For example, $BiF_3$ has been formulated with carbon or $MoS_2$ as a conductive matrix to obtain highly reversible, high energy density nanocomposites. $BiF_3$-20% $MoS_2$ nanocomposites have a higher energy density than NCA and are much safer. Although the volume expansion is large (less so for $NiF_2$), the fact that they are based on a ductile matrix material ($MoS_2$ is a "platy" graphite-like material widely used as a lubricant) suggests that a $MoS_2$-containing nanocomposite will possess robust mechanical properties capable of cycling without failure. $NiF_2$ offers significantly higher energy density potential than $BiF_3$.

Although enabling exceptional energy density, metal fluoride nanocomposites cannot be directly incorporated into Li-ion batteries without also providing a source of working lithium ions. The controlled formation of a lithiated nanocomposite (MeFx→Me+xLiF) is crucial, as it is a subnanocomposite which forms within the metal fluoride domain. There are at least two approaches towards the prelithiation of the nanocomposite, both leading to the desired (LiF+Me) subnanocomposite, where Me may be Fe, Ni, Co and Bi, amongst other metals. One technique is to directly fabricate, through chemical or physical means, a nanocomposite of LiF+Me. The other technique is to utilize a reduction reaction applied to the prefabricated metal fluoride. The latter reaction has a number of benefits over the former. The practical benefit is that it is very difficult to form directly a nanocomposite on the scale of 1-2 nm consisting of a pure metal and an alkali fluoride from a top-down approach. Reduction reactions, either driven through physical, thermal or electrochemical interactions with a reducing agent or potential are the most elegant way to form very fine nanostructures. Through this technique it is possible to form a nanocomposite on the scale of 1-2 nm as the formation of the components (LiF and Me) is developed from a nucleation and growth process.

Metal fluorides offer high specific energy as well as energy density. Table 2 depicts several embodiments of metal fluorides which offer specific energy density well above the 600-800 Wh/kg exemplified by today's state of the art intercalation materials. The prelithiation technique may be applied to Ni. Prelithiation provides the ability to engineer not only the LiF/Me domains but also to engineer new mixed conducting matrices.

TABLE 2

Theoretical average voltage, specific capacity, and specific energy expected during a conversion reaction with Li for a variety of simple divalent and trivalent fluorides.

| $2Li^+ + Me^{2+}X_z \rightarrow 2zLiF + Me$ | | | | $3Li^+ + Me^{3+}X_z \rightarrow 3zLiX + Me$ | | | |
| --- | --- | --- | --- | --- | --- | --- | --- |
| $Me^{2+}X$ | V | mAh/g | Wh/kg | $Me^{3+}X$ | V | mAh/g | Wh/kg |
| $MnF_2$ | 1.92 | 577 | 1108 | $VF_3$ | 1.86 | 745 | 1386 |
| $FeF_2$ | 2.66 | 571 | 1519 | $CrF_3$ | 2.28 | 738 | 1683 |
| $CoF_2$ | 2.854 | 553 | 1578 | $MnF_3$ | 2.65 | 719 | 1905 |
| $NiF_2$ | 2.96 | 554 | 1640 | $FeF_3$ | 2.74 | 712 | 1951 |
| $CuF_2$ | 3.55 | 528 | 1874 | $BiF_3$ | 3.13 | 302 | 945 |

In some embodiments, the lithium storage material comprises a compound $Li_xM_yXO_4Z_z$, where M comprises a metal, X is P, S, or As, and Z is a halogen, including without limitation compounds of olivine or NASICON structure type or compounds where M includes one or more first-row transition metals. In some embodiments the electrode comprises a doped lithium iron phosphate olivine or doped lithium manganese phosphate olivine or solid solutions of the two. Lithium metal phosphates, silicates, and sulfates, including those of composition $Li_xM_yPO_4$ (where M comprises one or more first-row transition metals and other non-transition metals) crystallizing in the olivine structure, can be used in sintered electrodes and batteries based on such electrodes. Such olivines are of interest for high power and long-life batteries for a wide range of applications including power tools, transportation, and stationary applications. Exemplary lithium storage materials include those disclosed in United States Published Application 2004/0005265 (corresponding to U.S. patent application Ser. No. 10/329,046, entitled "Conductive Lithium Storage Electrode"); U.S. patent application Ser. No. 11/396,515, filed Apr. 3, 2006 entitled "Nanoscale Ion Storage Materials"; and U.S. patent application Ser. No. 11/518,974, filed Sep. 11, 2006 entitled "Lithium Secondary Cell With High Charge And Discharge Rate Capability And Low Impedance Growth", each of which is herein incorporated by reference in its entirety;

In some embodiments, the positive electrode includes a lithium-transition metal-phosphate compound as the electroactive material. The lithium-transition metal-phosphate compound may be optionally doped with a metal, metalloid, or halogen. In some embodiments, the positive electroactive material is an olivine structure compound $LiMPO_4$, where M is one or more of V, Cr, Mn, Fe, Co, and Ni, in which the compound is optionally doped at the Li, M or O-sites. Deficiencies at the Li-site are compensated by the addition of a metal or metalloid, and deficiencies at the O-site are compensated by the addition of a halogen. In some embodiments, the positive active material is a thermally stable, transition-metal-doped lithium transition metal phosphate having the olivine structure and having the formula $(Li_{1-x}Z_x)MPO_4$, or $Li(M_{1-x}Z_x)PO_4$ where M is one or more of V, Cr, Mn, Fe, Co, and Ni, and Z is a non-alkali metal dopant such as one or more of Ti, Zr, Nb, Al, Ta, W or Mg, and x ranges from 0.005 to 0.05. In a typical battery, the electroactive material is $(Li_{1-x}Z_x)MPO_4$, where Z is Zr, Nb or Ti.

Doped lithium iron phosphate compounds may be prepared from starting materials of lithium salts, iron compounds and phosphorous salts including, but not limited to, lithium carbonate, ammonium phosphate and iron oxalate, to which a low additional concentration of dopant metal such as Mg, Al, Ti, Fe, Mn, Zr, Nb, Ta and W have been added, typically as a metal oxide or metal alkoxide. The powder mixture is heated under a low oxygen environment at a temperature of 300° C. to 900° C. These compounds exhibit increased electronic conductivity at and near room temperature, which is particularly advantageous for their use as lithium storage materials. Further details regarding the composition and preparation of these compounds are found in United States Published Application 2004/0005265 (corresponding to U.S. patent application Ser. No. 10/329,046, entitled "Conductive Lithium Storage Electrode"), which is incorporated herein in its entirety by reference.

In some embodiments, the alkali transition metal phosphates include those described in U.S. patent application Ser. No. 11/396,515, filed Apr. 3, 2006 entitled "Nanoscale Ion Storage Materials" which is incorporated herein in its entirety by reference. Examples include nanoscale ordered or partially disordered structures of the olivine $(A_xMPO_4)$, NASICON $(A_x(M',M'')_2(PO_4)_3)$, VOPO$_4$, LiVPO$_4$F, LiFe(P$_2$O$_7$) or Fe$_4$(P$_2$O$_7$)$_3$ structure types, wherein A is an alkali ion, and M, M' and M'' are metals.

In one embodiment, the positive electrode active compound has an overall composition of $Li_{x-a}M''_aFePO_4$.

In some embodiments, the positive electrode active compound is $LiFePO_4$.

In some embodiments, the positive electrode active compound is $LiCoO_2$.

During use as a lithium storage material, the electrode material undergoes a substantially large molar volume change (the molar volume being defined as the volume for a mole of the formula unit of the compound, for example a mole of $LiMPO_4$ where M is a metal). The change in molar volume upon lithium insertion or removal may be due to expansion or contraction of a phase of the compound or due to a change in phase of the material including a change between different crystalline phases or between crystalline and amorphous phases. Multiple electrocycling between different states having large volume differences can lead to mechanical failure, e.g., macroscopic cracking, of the electrode. In some embodiments the change in molar volume may exceed about 2%, or may exceed that of $LiCoO_2$ during cycling between the compositions $LiCoO_2$ and $Li_{0.5}CoO_2$. In some embodiments, the change in molar volume may exceed about 5%, or even about 10%.

Sintered nanostructures and processes that provide the high density, electronically conductive, mechanically robust monolithic electrodes and subassemblies are provided. In some embodiments, the cathode is the porous densified member because cathode compounds typically have the poorer electronic conductivity and benefits most from the proposed design. In other embodiments, anodes are a porous member. Starting with powders that are either synthesized in or comminuted to primary crystallites of nanoscale dimensions (for power), sintering provides electrodes of the desired density and particle size. The microstructure and physical/mechanical properties of the sintered cathodes and electrochemical cycling tests can establish mechanical durability and cycle life as functions of cycling rate and microstructural length scale. For example, reversible microcracking is probably acceptable. Straightforward experimentation allows one to iteratively reduce the length scale of the cathode active materials to improve rate capability and life in order to arrive at the combination of material, microstructure, and process that provides a desired level of performance.

In some embodiments, larger scale cathodes, e.g., 7.4×7.4 cm are prepared by dry-pressing, roll-compaction, or tape casting. These are forming processes well-known to those skilled in the art of ceramic processing. Tape casting is well-suited for large, thin flat ceramic parts. A 1 mm thickness is well within tape cast thickness range, and the process is suitable for high volume production. The tape casting process includes the following steps:

a) Slurry preparation A starting slurry is composed of a nanocomposite oxide or fluoride, a carrier liquid, and, optionally, various additives to stabilize the slurry suspension. A stable suspension is critical in obtaining a uniform particle distribution during casting. In some embodiments, the additive includes one or more of: deflocculants, wetting agents, binders, and sintering aids. For example, in some embodiments, slurries are prepared in jar mills using programmed mix speed and duration. In addition to the carrier liquid and additive types, other key variables in slurry preparation include the size and composition of the jar and milling media, and the solids loading in the slurry. Slurry viscosity can be routinely measured using a Brookfield DV-E rotational viscometer.

b) Tape casting The slurry is tape cast to form green sheets of electrode material. In the tape casting process the key variables are the casting head, cast speed and drying method. Exemplary drying processes include various combinations of radiant, conductive and forced air heating to remove the solvent carrier used in the slurry. The process variables are adjusted to attain uniform powder density on the vertical axis, homogeneous binder distribution, and surface uniformity without skin formation.

c) Firing Cast green forms are fired using a programmed heating schedule under controlled atmosphere. In some embodiments, to retain good film uniformity through the sintering step the heating rate is tightly controlled, particularly approaching the initiation point for burning out the binder to minimize bloating or cracking of the film. After binder burn-out, in some embodiments, the firing step continues, sintering the electrode material to the desired porosity. The appropriate heating conditions can be established with the help of DSC/TGA data to limit degradation of the nanostructure through excessive grain growth or segregation of the matrix material.

In some embodiments, the cells and devices described herein include a lithium metal anode. In other embodiments, the cells and devices include amorphous metal alloy anodes.

In one embodiment, the negative electroactive material includes lithium metals. In another embodiment, the negative electroactive material includes lithium alloy. In one example, the anode is lithium metal, which can maximize energy density. Since the cathode materials are pre-lithiated, the lithium in the anode does not contribute to reversible capacity, but it does serve to compensate for first cycle loss and provide a template that enhances the quality and reversibility of the film deposited during charge. Vapor deposition of the lithium metal anode onto copper current collector substrates is one method for fabricating the anodes (another method being physical lamination of thin lithium foils). For the lithium, in one embodiment, a vacuum thermal evaporation source is used. If Lipon provides a sufficiently defect-free barrier, depositing the lithium directly over the Lipon will eliminate the liquid electrolyte and completely stabilize the interface against dendrite formation.

Another exemplary anode material is lithium alloys based on Si or Sn. Cell designs based on lithium alloys will use anodes produced using conventional electrode casting approaches.

In one embodiment, the separator is an Lipon barrier coating. Lipon barrier coating is prepared, for example, using physical vapor deposition of thin film materials. One exemplary process sputter deposits lithium phosphorous oxynitride electrolyte, which is known as Lipon. This electrolyte is deposited as a thin film (e.g., 0.5 to 3 micrometers thick) for the thin film batteries. The material is amorphous, so there are no grain boundaries to act as pathways for lithium dendrite growth. Lipon is stable to >300° C. and electrochemically stable with lithium and to cell potentials >5.5V. The lithium ion transport is adequate for thin films, adding ~100 $\Omega cm^2$ to the cell resistance, and the electronic conduction is negligible. The extraordinarily high electronic resistance ensures that the self discharge rate is low. Lipon is ideal for increasing both safety and specific energy.

The method desirably provides good coverage with the electrolyte into grooves along grain boundaries to avoid any internal short circuits in the battery. There are well understood techniques to achieve good film coverage.

Lipon is generally grown by RF magnetron sputtering under conditions where most of the sputtered atoms have thermal energies and off-axis impact angles when they reach the substrate. Film coverage can be improved using various substrate alignments, electric and magnetic field configurations, and control of the process gas composition and pressure. The Lipon films can be evaluated for coverage, composition, microstructure, density and lithium conductivity.

In some embodiments, the separator technical approach also includes inserting proprietary nanocomposite separator technology as described above. These innovative separators will be coated onto monolithic cathodes. The nanocomposite separators offer potential to reduce parasitic weight and enhance safety under overcharge or impact events.

Exemplary coated nanocomposite separators include those disclosed in U.S. patent application Ser. No. 12/196,203, filed Aug. 21, 2008, entitled "Separator for Electrochemical Cell and Method for Its Manufacture", which is incorporated by reference in its entirety. For example, in some embodiments, the separator is a porous composite material including inorganic filler (or ceramic) particles and polymer. The separator is formed from a highly uniform distribution of inorganic filler material and polymer, that is, there is no discernible unevenness in the distribution of polymer and an inorganic filler material throughout the membrane. There are substantially no regions of the membrane having discernible regions of predominantly polymer or ceramic material. The separation materials should be electronically insulation when used in an electrochemical cell.

The use of a ceramic separator provides safety advantages over conventional polymer separators. During the firing or sintering process, conventional polymer separators have a tendency to shrink, thereby reducing the effectiveness of the bond between the electrode and the separator. Separators comprising ceramic materials do not shrink when fired. Accordingly, the bond between the separator and the electrode(s) remains strong, with little tendency to separate.

A separator membrane for an electrochemical cell may be formed directly onto an electrode by utilizing a coating solution comprised of a polymer, a solvent system for the polymer and a ceramic material dispersed in the solvent. Application of the separator membrane components from a solution onto the electrode layer provides a durable bond between the two layers. The separator precursor solution is coated onto a surface of an electrode so as to form a liquid layer. The solvent is removed from this layer leaving a porous solid body comprised of the polymer and the ceramic material. Finally this polymer is cured by heating for a period of time to a temperature greater than the polymer melt temperature ($T_m$) or glass transition temperature ($T_g$). As a result, the separator membrane is directly bonded to the surface of the electrode, so that the membrane has unusually good adhesion to the electrode active layer. This excellent adhesion improves performance by reducing interfacial resistance between the electrodes and the separator membrane.

Exemplary polymer materials for use with the coated nanocomposite separators include polymers which are compatible with the chemistry of a particular battery system. The polymer should be electrically insulating, should have low solubility in electrolyte solvents and be chemically and electrochemically stable in the cell. The polymer may be a single polymer or a mixture of polymers. Exemplary materials include polyvinylidene fluoride (PVDF)-based polymers, such as poly(vinylidene fluoride) (PVDF) and its co- and terpolymers with hexafluoroethylene, tetrafluoroethylene, chlorotrifluoroethylene, poly(vinyl fluoride), polytetraethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers. One group of polymers having utility in lithium and lithium ion battery systems, as well as other battery systems, includes fluorinated polymers and latex polymers such as styrene butadiene and other styrene-based polymers. Latex polymer systems tend to form polymer suspensions and may not be solubilized in the liquid carrier. Polyvinylidene fluoride polymer compositions including polyvinylidene fluoride copolymers and terpolymers are one group of polymers having specific utility. There are a variety of such materials known and available in the art, and such materials may comprise essentially homogeneous PVDF as well as blends and copolymers. One particular material is a PVDF material sold under the trademark Kureha 7208. Other equivalent and similar materials may likewise be employed. See, for examples, the materials discussed above for the preparation of the anode and cathode active layers.

The inorganic component for the coated nanocomposite separators is selected from a variety of natural and artificial materials that are compatible with the particular battery systems and chemistry in which the membranes are to be incorporated. Mixtures of two or more suitable inorganic components are contemplated. The inorganic component may be a ceramic material. One particular group of ceramic materials comprises silica, with fumed silica being one specific form of silica which may be employed. Fumed silica is a high surface area, generally high purity silica material. Fumed silica is generally hydrophilic and can be wetted easily by most electrolyte solvents and many polar polymers. A material which has been used in one or more embodiments has a surface area of approximately 200 $m^2/g$. The particles are very small and typically are less than 500 nm in diameter, or less than 200 nm in diameter, and more typically about 10-20 nm. In one or more embodiments, the ceramic material is fumed silica having a narrow particle size distribution and a substantially spherical shape. Fumed silica can be prepared in a carefully controlled reaction of silicon tetrachloride ($SiCl_4$) that results in a highly controllable and narrow particle size distribution. In one embodiment, a fumed silica having a particle size of about 14 nm may be employed.

Other silicon compounds may be utilized as a ceramic component of the separators, such as for example, polyhedral oligomeric silesquioxane (POSS), which in the context of this disclosure is considered to be a ceramic material. Other ceramic materials include natural and synthetic zeolites, alumina, titania and the like. In addition, other electrochemically stable inorganic particles of appropriate size can be used, e.g., MgO, $CaCO_3$ and other metal carbonates, zirconia, silicon phosphates and silicates. The ceramic materials may be used either singly or in combination, with uniform or mixed sizes and shapes as well.

The solvent system used in the preparation of the coating solution comprises any solvent system in which at least one component of the coating solution is capable of dissolving the polymer component. Suitable second or further components may be used; if not capable of dissolving the polymer, the additional components are highly miscible with the first solvent. Preferably, the solvents are relatively easy to remove during subsequent processing steps. One solvent which has been found to have utility in connection with PVDF-based membranes includes N-methylpyrrolidinone (NMP), and the NMP may be blended with another solvent such as acetone, ethyl acetate, and propyl acetate for example, to obtain the appropriate slurry rheology. By way of example, solvents of different boiling points may be used to control solvent evaporation rates and thus film stresses which are generated during drying of the liquid slurry. One specific solvent mixture which was utilized in one implementation of the present invention comprised, on a volume basis, a 30:70 NMP/acetone mixture. Others include 30% NMP with 70% of propyl acetate, methyl ethyl ketone (MEK), or ethyl acetate. The composite slurry is a relatively homogeneous suspension which is relatively stable in the absence of shear.

The high energy density cells described herein operate using conventional carbonate-based electrolytes. In some embodiments, additives known to those skilled in the art to suppress lithium dendrite formation (mossy lithium) are used. Electrolyte wetting in the electrode monoliths has not been a major issue. However, the proposed larger cross-section electrodes may require surfactant/surface functionalization and particle/pore size engineering to facilitate wetting and electrode infiltration.

In one embodiment, the electrolyte system includes a liquid electrolyte to obtain rapid kinetics throughout the electrode. The use of liquid electrolytes in addition to an LiPON solid electrolyte barrier is particularly useful for situations involving thick electrodes, such as the sintered electrodes and sintered electrode-separator sub-assemblies described herein.

The electrodes may be incorporated into any energy storage device having any size, design or geometry. In one embodiment, the electrode is incorporated into a bipolar cell. A bipolar cell includes at least two electrochemical cells, where the negative and positive electrodes of successive cells share a common current collector and are stacked in series. The cell voltages are therefore additive. The advantages of such a design are high power and energy density, as the amount of inert materials and current path are minimized. In some embodiments, the sintered electrode allows thicker electrodes to be used, as the electrical pathway is continuous between different particles. The sintered electrode also may be more uniform in thickness than a traditional wet solvent slurry-cast electrode coating. This is important in the bipolar design, as cell-to-cell variation in capacity or power capability can complicate usage.

In another embodiment, a negative electrode compatible with an aluminum-based current collector (for example, $Li_4Ti_5O_{12}$) is used. This allows both positive and negative electrodes to be coated on the same current collector material, simplifying manufacturing and operation and lowering cost.

In another embodiment, low or zero strain electrode materials are used for the negative and positive active materials for the bipolar cell. Alternatively, the negative and positive electrode materials are matched to achieve a net volume change that is minimized. $LiMPO_4$ and $Li_4Ti_5O_{12}$ are examples of low or zero strain materials. This minimizes the mechanical strain in the stack.

In another embodiment, a redox shuttle is used in the bipolar cell. A redox shuttle is an electrochemical compound or electroactive additive which "shuttles" current or allows electrical current to pass from cathode to anode, at a defined potential or voltage. The redox shuttle may serve as a controlled self-discharge of the cell and thus may be used to balance cells in the bipolar stack. For example, if one cell has a lower capacity than the other cells in the stack, it will reach the fully-charged voltage sooner. However, since the cells are in series, the current must continue to flow through that fully-charged cell, in order for the other cells to become fully charged. The redox shuttle allows the fully-charged cell to maintain that state-of-charge (SOC) without being over-charged.

In another embodiment, an electroactive polymer is used between the current collectors, or between negative and positive electrodes, to allow a controlled self-discharge at a defined potential or voltage. This is similar to the redox shuttle. However, instead of being a component in the electrolyte, the electroactive polymer is part of the cell design. The separator includes a porous scaffold comprised of particles of an electronically insulating material and an electroactive material, wherein the electroactive material forms a percolating path in the porous separator. Characteristics of the electroactive polymer include insolubility in the battery electrolyte, an oxidation potential above the normal charge potential of the positive electrode and below the potential at which degradation reactions occur in the cell, stability against reduction by the negative electrode for polymers placed adjacent to the negative electrode, resistance to "overoxidization" (where "overoxidization" is defined as oxidation that results in irreversible changes to the polymer), and a conductivity in the oxidized state that is sufficient to shunt the current during charge. Suitable materials and designs are described in U.S. Patent Publication No. 2009/0029261, filed Jun. 2, 2008 and entitled, Solid State Separator For Overcharge Protection (corresponding to application Ser. No. 12/131,892), the contents of which are incorporated in their entirety by reference.

Exemplary electroactive polymers (voltage window) include poly(thiophene) (3.8 V to 4.8V), poly(pyrrole) (3.3V to 4.3V), poly(fluorene), poly(phenylene-vinylene), polyaniline, poly(phenylene sulfide), polyaniline, polypyrrole, and polyphenylene, any of which may include substituents such as alkyl, aromatic, and/or halogen substituents. Exemplary substituted polymers include poly(3-butyl thiophene) and poly(dioctyl fluorenyl).

Exemplary electronically insulating materials can be made up of any inert material that is electronically insulating and that can provide structural support for the electroactive material and the electrolyte. It can be an organic polymer or a ceramic material. The structural insulating material may be selected from a variety of natural and artificial materials that are compatible with the particular battery systems and chemistry in which the separators are to be incorporated. In one or more embodiments, the inert structural insulating materials form a continuous phase. Exemplary materials include polymers comprising polypropylene, polyethylene, polyimide, ethylene-propylene copolymers, polyethersulfone, or similar polymers known to those skilled in the art of separators for lithium-ion batteries. Exemplary materials also include ceramic powders such as ceramic oxides. One particular group of ceramic materials comprises silica, with fumed silica being one specific form of silica which may be employed. Fumed silica is a high surface area, generally high purity silica material. Fumed silica is generally hydrophilic, and a material which has been utilized in the practice of the present invention has a surface area of approximately 200 $m^2/g$. Other silicon compounds may be utilized as a ceramic component of the separators. Another exemplary silicon-based material is polyhedral oligomeric silesquioxane (POSS), which in the context of this disclosure is considered to be a ceramic material. Other ceramic materials include natural and synthetic zeolites, aluminas, titanias, zirconias, magnesias, and the like. The structural insulating materials may be used either singly or in combination. The structural insulating materials can be particles having a particle size of less than about 2 µm, or less than about 0.5 µm or less than about 0.1 µm.

An exemplary cell, as illustrated in FIG. 3, is a prismatic pouch cell assembled from a parallel array stack of between five and ten 7.4×7.4×0.1 cm electrodes. A scaling up of the electrode area and building a parallel array may be implemented in incremental development stages (FIG. 6). FIG. 6 illustrates a 56 $cm^3$ prototype assembled as 1 cm parallel stack of 7.4 cm electrodes.

In some embodiments, electrodes are assembled into laboratory pouch cells incorporating lithium foil anodes, polypropylene separators and 1M $LiPF6$: alkyl carbonate electrolyte. In some embodiments, the assembled cells undergo several formation cycles at C/10.

Capacity and rate capability test. Cells are evaluated on a computer-controlled battery tester, for example a Maccor 96-channel battery tester, using established testing protocols. The cells are initially cycled at a low constant current of C/5 to determine the electrode or cell capacity. Then, they are cycled at different C-rates to examine the rate performance.

Cycling test. The electrochemical cells can be charged and discharged at the selected C-rate until the reversible capacity fades below 80% of the first cycle capacity to examine the cycling stability. Cycling at different temperatures is performed to examine the thermal stability of the materials and cell designs.

Impedance analysis. Impedance analysis is conducted on cells alternatively before or after cycling, for example using a Solartron SI 1260 Impedance/Gain-Phase Analyzer with a SI1287 Electrochemical Interface. Electrochemical impedance spectroscopy (EIS) serves to characterize the transport properties of the nanocomposite electrode as a function of state of charge. EIS data can be used to establish quantitative links between macroscopic response and the electrode microstructure. Multi-dimensional impedance analysis using a three-electrode cell configuration is used in order to better understand interactions between the material and electrolyte at different charge states. A thin lithium foil (200 µm) can be used to prepare both counter and reference electrodes.

Abuse testing: ARC measurements are performed to assess fundamental thermal stability properties of various electrode/electrolyte combinations. Hot box, nail penetration and overcharge tests according to UL standard test procedures for rechargeable lithium batteries also establish cell safety.

We claim:

1. A subassembly for use in an electrochemical device comprising:
   (a) a first sintered electrode having a first surface and a second surface opposing the first surface,
   (b) a first current collector surrounds a perimeter of the first electrode orthogonal to the first sintered electrode's first surface, where a perimeter area of a portion of the first sintered electrode bonded to the first current collector is less than about 50% of a total area of the first sintered electrode, wherein the current collector is an inactive component, and
   (c) a separator, wherein the second surface of the first sintered electrode is adjacent to the separator,
   wherein the first sintered electrode is bonded to the separator or the first current collector or both, and
   wherein the separator, the first current collector, or both are optionally sintered, and
   (d) a second electrode, wherein the first and second electrodes are bonded to opposite surfaces of the separator.

2. The subassembly of claim 1, wherein the first current collector is in the shape of a border or frame.

3. The subassembly of claim 1, wherein the first current collector comprises a metallic current collector.

4. The subassembly of claim 1, wherein the separator comprises an organic compound, an inorganic-organic composite or blend, an inorganic compound, a particulate material, or a sintered particulate ceramic.

5. The subassembly of claim 1, wherein the first electrode comprises a layered oxide, a metal fluoride, or a lithium-transition metal phosphate compound, which optionally includes a dopant metal.

6. The subassembly of claim 1, wherein a portion of the first sintered electrode's first surface to which the first current collector is confined is less than about 25% of the total area of the first sintered electrode.

7. The subassembly of claim 6, wherein the portion of the first sintered electrode's first surface to which the first current collector is confined is less than about 15% of the total area of the first sintered electrode.

8. The subassembly of claim 1, wherein the second electrode comprises a sintered electrode.

9. The subassembly of claim 1, further comprising a second electrode and a second current collector, wherein the second electrode and the first electrode have a thermal bond to opposite surfaces of the separator and wherein the second current collector and the separator are bonded to opposite surfaces of the second electrode.

10. The subassembly of claim 1, wherein a thickness of an active layer of the first sintered electrode in the subassembly is at least about 200 µm.

11. The subassembly of claim 1, wherein a density of the subassembly is at least about 65% of theoretical.

12. The subassembly of claim 1, wherein the first electrode does not comprise a conductive additive.

13. The subassembly of claim 1, wherein a thickness of the first electrode is at least about 600 µm.

14. A subassembly for use in an electrochemical device comprising
   (a) a first sintered electrode having a first surface and a second surface opposing the first surface, and
   (b) a first current collector surrounding a perimeter of the first sintered electrode's first surface, where a perimeter area of a portion of the first sintered electrode bonded to the first current collector is less than about 50% of a total area of the first sintered electrode and wherein the current collector is an inactive component, and
   (c) a separator, wherein the second surface of the first sintered electrode is adjacent to the separator,
   wherein the subassembly is produced by
      (i) combining the first electrode with the first current collector and the separator and
      (ii) heating the first electrode, the first current collector, and the separator under conditions effective to form a sintered subassembly,
   wherein the separator, the first current collector, or both are optionally sintered.

15. The subassembly of claim 14, wherein the separator comprises a sintered separator.

16. The subassembly of claim 14, wherein the first current collector comprises a metallic current collector.

17. The subassembly of claim 14, wherein a portion of the first sintered electrode's first surface to which the first current collector is confined is less than about 25% of the total area of the first sintered electrode.

18. The subassembly of claim 17, wherein the portion of the first sintered electrode's first surface to which the first current collector is confined is less than about 15% of the total area of the first sintered electrode.

19. The subassembly of claim 14, further comprising a second electrode, wherein the first and second electrodes are bonded to opposite surfaces of the separator.

20. The subassembly of claim 19, wherein the second electrode comprises a sintered electrode.

21. The subassembly of claim 19, wherein the second electrode is free of conductive additives.

22. The subassembly of claim 14, further comprising a second electrode and a second current collector, wherein the second electrode and the first electrode are heated with the separator, the first current collector, and the second current collector to form a sintered subassembly.

23. The subassembly of claim 14, wherein the separator comprises an organic compound, an inorganic-organic composite or blend, an inorganic compound, a particulate material, or a sintered particulate ceramic.

24. The subassembly of claim 14, wherein the first electrode comprises a layered oxide, a metal fluoride, or a lithium-transition metal phosphate compound, which optionally includes a dopant metal.

25. The subassembly of claim 14, wherein a thickness of the subassembly is at least about 200 µm.

26. The subassembly of claim 14, wherein a density of the subassembly is at least about 65% of theoretical.

27. The subassembly of claim 14, wherein the first electrode does not comprise a conductive additive.

28. The subassembly of claim 14, wherein a thickness of the first electrode is at least about 600 μm.

29. An electrochemical device comprising:
(a) a positive electrode in electronic contact with a positive electrode current collector, the positive current collector in electrical connection with an external circuit;
(b) a negative electrode in electronic contact with a negative electrode current collector, the negative current collector in electrical connection with an external circuit;
(c) a separator positioned between the positive electrode and the negative electrode; and
(d) an electrolyte in ionic contact with the positive and negative electrodes;
wherein the positive electrode or the negative electrode and the separator comprise a sintered subassembly,
wherein at least one of the positive and negative electrodes is a sintered electrode having a first surface and a second surface opposing the first surface and the sintered electrode's corresponding current collector surrounds a perimeter of the sintered electrode and is less than about 50% of a total area of the sintered electrode, and wherein the current collector is an inactive component.

30. The electrochemical device of claim 29, wherein a mass fraction of inactive materials in the device is less than about 50%.

31. The electrochemical device of claim 29, wherein a specific energy of the device is greater than about 300 Wh/kg at a power density of greater than about 600 W/kg.

32. The electrochemical device of claim 29, wherein the positive electrode does not comprise a conductive additive.

33. The electrochemical device of claim 29, wherein a thickness of the positive electrode is at least about 600 μm.

34. A process for preparing a subassembly for use in an electrochemical device according to claim 1 comprising:
(a) combining a first electrode with a separator; and
(b) heating the first electrode and the separator under conditions effective to form a sintered subassembly; and
(c) before or after the heating step, positioning a first current collector around the perimeter of the first electrode,
wherein the process produces a bond between at least the first electrode and the separator.

35. The process of claim 34 wherein the first current collector is bonded to the first electrode.

36. The process of claim 35, wherein bonding comprises forming a metal-metal bond between the first current collector and a metal film deposited at the first electrode perimeter, or thermal bonding or a forming a bond with a conductive adhesive.

37. The process of claim 34, wherein the first current collector comprises a metallic current collector.

38. The process of claim 34, wherein the heating step comprises heating the first electrode, the separator and the first current collector to form a sintered subassembly.

39. The process of claim 34, wherein a second electrode is combined with the first electrode and the separator, wherein the process produces a bond between first and second electrodes and opposite surfaces of the separator.

40. The process of claim 39, wherein the second electrode comprises a sintered electrode.

41. The process of claim 38, wherein the combining step further comprises combining a second electrode and a second current collector with the first electrode, the first current collector and the separator, and wherein the heating step comprises heating the second electrode and the first electrode with the separator, the first current collector, and the second current collector to form a sintered subassembly.

42. The process of claim 34, wherein the sintered separator comprises an organic compound, an inorganic-organic composite or blend, an inorganic compound, a particulate material, or a sintered particulate ceramic.

43. The process of claim 34, wherein the first sintered electrode comprises a layered oxide, a metal fluoride, or a lithium-transition metal phosphate compound, which optionally includes a dopant metal.

44. The process of claim 34, wherein the first electrode does not comprise a conductive additive.

45. The process of claim 34, wherein the thickness of the first electrode is at least about 600 μm.

46. A bipolar cell, comprising a plurality of stacked electrochemical cells, wherein the electrochemical cells are joined in series and wherein each of said stacked electrochemical cells comprises:
(a) a positive electrode in electronic contact with a positive electrode current collector, the positive current collector in electrical connection with an external circuit;
(b) a negative electrode in electronic contact with a negative electrode current collector, the negative current collector in electrical connection with an external circuit;
(c) a separator positioned between the positive electrode and the negative electrode; and
(d) an electrolyte in ionic contact with the positive and negative electrodes;
wherein the positive electrode and the negative electrode of each stack comprise a sintered electrode,
wherein at least one of the positive and negative electrodes is a sintered electrode having a first surface and a second surface opposing the first surface and the sintered electrode's corresponding current collector surrounds a perimeter of the sintered electrode and is less than about 50% of a total area of the sintered electrode.

47. The bipolar cell of claim 46, wherein the separator comprises a sintered separator.

48. The bipolar cell of claim 46, wherein (a) the separator and (b) the positive electrode or the negative electrode or both are bonded.

49. The bipolar cell of claim 46, wherein (a) the positive electrode and (b) the separator or the positive current collector or both are bonded.

50. The bipolar cell of claim 46, wherein (a) the negative electrode and (b) the separator or the negative current collector or both are bonded.

51. The bipolar cell of claim 46, wherein the positive current collector, the positive electrode, the separator, the negative electrode and the negative current collector are bonded.

52. The bipolar cell of claim 46, wherein (a) the positive electrode and (b) the separator or the positive current collector or both comprise a sintered subassembly.

53. The bipolar cell of claim 46, wherein (a) the negative electrode and (b) the separator or the negative current collector or both comprise a sintered subassembly.

54. The bipolar cell of claim 46, wherein the positive current collector, the positive electrode, the separator, the negative electrode, and the negative current collector comprise a sintered subassembly.

55. The bipolar cell of claim 46, wherein the positive electrode or the negative electrode formed from a sintered ceramic is at least about 200 μm in thickness.

56. The bipolar cell of claim 46, wherein a sintered subassembly is at least about 200 μm in thickness.

57. The bipolar cell of claim 46, wherein the cell further comprises a redox shuttle.

58. The bipolar cell of claim 46, wherein the electrolyte comprises an electroactive additive.

59. The bipolar cell of claim 46, wherein the separator comprises an electroactive polymer, wherein the electroactive polymer forms a percolating pathway through the separator.

60. The bipolar cell of claim 46, wherein a thickness of the positive electrode or the negative electrode formed from a sintered ceramic varies by less than 25% from a mean thickness.

61. The bipolar cell of claim 46, wherein the positive electrode does not comprise a conductive additive.

62. The bipolar cell of claim 46, wherein a thickness of the positive electrode is at least about 600 μm.

* * * * *